United States Patent [19]

Bernardin

[11] 3,993,794

[45] Nov. 23, 1976

[54] METHOD FOR TEXTURIZING PROTEINS

[75] Inventor: John Emile Bernardin, El Sobrante, Calif.

[73] Assignee: The United States of America as represented by the Secretary of Agriculture, Washington, D.C.

[22] Filed: Jan. 15, 1976

[21] Appl. No.: 646,123

[52] U.S. Cl. ............................ 426/574; 426/656; 426/515; 426/517; 526/802; 260/123.5; 426/573

[51] Int. Cl.² ........................................ A23J 3/00

[58] Field of Search ........... 426/656, 802, 574, 515, 426/517, 519; 260/112 R, 112 G, 123, 123.5

[56] References Cited

UNITED STATES PATENTS

| 3,030,211 | 4/1962 | McDonald | 426/656 X |
|---|---|---|---|
| 3,794,731 | 2/1974 | Dannert et al. | 426/802 X |
| 3,814,823 | 6/1974 | Yang et al. | 426/802 X |
| 3,821,453 | 6/1974 | Hoer | 260/123.5 X |
| 3,870,801 | 3/1975 | Tombs | 426/656 X |
| 3,925,562 | 12/1975 | Tannenbaum | 426/656 X |

Primary Examiner—A. Louis Monacell
Assistant Examiner—Esther L. Massung
Attorney, Agent, or Firm—M. Howard Silverstein; David G. McConnell

[57] ABSTRACT

A texturized protein is formed by a process wherein a cereal grain protein capable of forming microfibrillar aggregates is first dissolved in water, and the pH of the solution is adjusted to 5.0–6.0. Then, the ionic strength of the solution is adjusted to 0.004–0.010 to aggregate the protein molecules into microfibrils, which are subsequently aligned in a parallel arrangement by application of a unidirectional shear thereto. Finally, an oscillating shear is applied to the aligned microfibrils, causing them to collide and thereby become texturized.

15 Claims, No Drawings

METHOD FOR TEXTURIZING PROTEINS

DESCRIPTION OF THE INVENTION

This invention relates to and has among its objects the provision of novel methods for texturizing proteins derived from cereal grains. Further objects of the invention will be obvious from the following description wherein parts and percentages are by weight unless otherwise specified.

Proteins are essential to the human diet. An important and preferred source of protein for humans is meat from animals, poultry, and fish. Recently, meat supplies, even in the United States, have been limited. Furthermore, cost of meat has risen tremendously. Thus, both affluent as well as non-affluent countries have found it necessary to look to other sources of protein.

The human species, however, has become accustomed to the texture, appearance, bite, flavor, and color of meat. Thus, this source of protein is the most attractive to the human palate.

There are many other sources of proteins which are nutritionally adequate for the human diet. For example, proteins from oil seeds, cereal grains and other vegetable products are as nutritionally valuable as meat protein. Although nutritious, however, proteins from these sources are unappetizing because of their unfamiliar and undesirable texture, color, etc.

Methods are known for providing vegetable proteins with acceptable textural and nutritional qualities. The known processes usually involve the use of extruders, heat, pH adjustments, binders or gel-inducing chemicals, etc.

I have found that certain proteins from cereal grains may be gelled by a simple method which avoids the use of heat or binders and the like. The gelled proteins may be used as is or they may be texturized further to produce a protein material with a meat-like texture. The term "texturized" is used herein to refer to a broad range of texture from that of a soft gel to a fully-texturized product having the consistency of meat. It is within the compass of the invention to attain a texture within this broad range.

The proteins which may be texturized in accordance with the invention are cereal grain proteins which are capable of forming microfibrillar aggregates. In other words, under certain conditions molecules of these proteins will aggregate to form fiber-like structures called fibrils. Since the size of the aggregates is approximately 50–100 angstroms in diameter, the term "microfibrils" is appropriate. Thus, the proteins which may be texturized in accordance with the invention can be distinguished from proteins which are extruded to form fibers. This extruded material is referred to as macrofibrillar and has a diameter of at least 100,000 angstroms or greater. In order to be texturized by the process of the invention, the cereal grain protein aggregates must be microfibrillar, i.e., they must have a diameter within the range of about from 50 to 100 angstroms.

Proteins, derived from cereal grains, which are capable of yielding aggregates of appropriate size for use in the invention include alpha-gliadin and other proteins isolated from the gliadin and glutenin fractions of the wheat. Such proteins can be extracted from the cereal grain by known procedures. For example, alpha-gliadin may be isolated from wheat by a combination of conventional techniques such as ultracentrifugation and gel filtration.

The cereal grains include, but are not limited to, wheat, rice, corn, triticale, oats, barley, rye, and the like. The invention may be applied to mixtures of proteins as well as to individual proteins provided, of course, that the proteins can be formed into the desired microfibrillar aggregates.

The texturized protein produced in accordance with the invention has certain physical properties of resilience, elasticity, and resistance to cutting, depending on the extent of texturization. If the protein is treated to obtain a gel, the product is generally hydrated. In addition, other substances such as carbohydrate materials, non-chewy proteins, fats, flavoring and coloring materials, vitamins and minerals may be incorporated in the gelled protein during the process of the invention. The gelled product may be used in foods wherein a gelled texture would be compatible as, for example, in gravies, puddings, gelled desserts, sauces, aspic, soups, salad dressings and marinades, relishes, and the like.

It is also within the compass of the invention to texturize the gel further to produce a protein with substantially increased chewiness over that of the gelled material, i.e., to form a product with a meat-like texture. In this event, the texturized protein may be used as a meat substitute in such foods as stews, hamburgers, meat loaves, meat patties, sausages, hashes, and the like. It is, of course, desirable to flavor the texturized protein in such dishes, and this may be accomplished by incorporating the appropriate flavoring components in the texturized protein or in the food that is prepared from the texturized protein.

One advantage of the invention, then, is its versatility. The texture can be controlled over a wide range from a gel to a fibrous, meat-like texture.

Basically, the process of the invention involves dissolving the protein in water, adjusting the pH of the solution to a value within the range of 5.0 to 6.0, aggregating the protein molecules within the solution to produce microfibrils of approximately 50 to 100 angstroms in diameter, aligning the so-formed aggregates in a parallel arrangement while still in solution, and causing the aligned aggregates to collide to form a texturized protein.

Thus, another advantage of the invention is that extreme heat is not required to produce a texturized protein. Furthermore, extremes in pH are avoided. Consequently, the protein is not denatured during the process of the invention and, therefore, maintains its nutritional value.

Another advantage of the invention is its simplicity. In most instances, a series of uncomplicated manipulations is all that is necessary to yield a texturized protein from an aqueous solution of the protein.

Another advantage of the invention is that binders or other additives are not necessary to form the texturized protein. Thus, products of the invention may be prepared containing only proteinaceous material without the presence of undesirable components.

DETAILED DESCRIPTION OF THE INVENTION

In a first step in the process of the invention, the protein is dissolved in water. Virtually any concentration of the protein in water may be used. It is, however, preferred to prepare an aqueous solution containing between 5 to 10% of the protein. It should be noted that a biphasic solution may be formed at higher concentrations of the protein in water. This is no problem, however, since the process of the invention works with equal efficiency on both homogeneous and biphasic aqueous solutions of the protein.

Following the dissolution of the protein in water, the pH is adjusted to a value of 5.0–6.0 by addition of an appropriate amount of a non-toxic acid or base. Any food-grade acid or alkali can be used. If addition of an acid is required, one may add hydrochloric acid, sulfuric acid, phosphoric acid, citric acid, tartaric acid, acetic acid, and the like. If an alkali must be added, one may use sodium hydroxide, potassium hydroxide, ammonium hydroxide, ammonia, etc. It is, of course, obvious that an adjustment of the pH would not be necessary if the pH of the solution of the protein was already within the above range.

After the pH has been adjusted to within the appropriate range, the solution is treated to form microfibrillar aggregates of the protein. In general, the ionic strength of the solution is adjusted, if necessary, to about from 0.004 to 0.010 moles X (ionic charge)$^2$/liter (these units will not be repeated hereafter and any reference to ionic strength should be taken as including such units). Within this range of ionic strength the proteins aggregate to form microfibrils of approximately 50 to 100 angstroms in diameter and several thousand angstroms in length. The ionic strength can be adjusted to the appropriate value by addition of a salt to the aqueous solution of the protein. Usually, the amount of salt necessary to produce the desired ionic strength is calculated, and then this amount is incorporated into the protein solution. Salts which may be used in this context to adjust ionic strength include, but are not limited to, chlorides, sulfates, carbonates, phosphates, acetates, nitrates, sulfites, phosphites, nitrites, etc., of potassium, sodium, ammonium, and the like.

The aqueous solution of the microfibrillar aggregates is next treated to align the aggregates in a parallel arrangement. Several methods may be employed to achieve this alignment, but they all encompass applying a unidirectional shear to the aqueous solution to induce laminar flow of the aggregated molecules therein. The term "laminar flow" is a term of art and is a type of laminar deformation. In the instant invention, unidirectional shear is applied to induce laminar deformation, i.e., to align the microfibrils in a parallel fashion. Shear is that strain resulting from applied forces that cause or tend to cause contiguous parts of a body to slide relatively to each other in a direction parallel to their plane of contact. The types of unidirectional shear which may be applied are planar or simple shear, rotational shear, telescopic shear, and twisting shear.

It is important to distinguish the above-mentioned definition of shear from the more conventional definition of shear, i.e., to cut, etc. The latter has no relationship whatsoever to the shearing strain which is used in the method of the invention.

As mentioned above, there are several methods for parallelly aligning the microfibrillar aggregates. The aqueous solution of the protein may be subjected to the action of a conventional viscometer—an instrument for measuring the viscosity of liquids. Viscometers are available that produce one of the aforementioned types of shear. For example, there are rotational viscometers producing rotational shear, cone plate viscometers producing twisting shear, capillary viscometers producing simple shear, etc.

Another method for aligning the microfibrils in the proper arrangement is simply to maintain a flow of the aqueous solution through a tube. The parameters of rate of flow of the liquid and diameter of the tubing may be selected to attain the proper alignment. Generally, a rate of flow should be chosen that will produce extinction of polarized light when the flow between crossed polarizers is parallel to one of the polarization directions. Conventional devices, such as a polarizing microscope, and the like, may be employed to determine the extinction point. It should be emphasized that, only when the microfibrils are parallelly aligned, will the polarized light be extinguished. Furthermore, it should be noted that maintaining a flow of the aqueous solution of proteins through a tube is merely another means of inducing laminar flow or distortion of the aggregated protein molecules.

Other methods of aligning the aggregates will be obvious to those skilled in the art. In general, unidirectional shear must be applied to the aqueous solution sufficient to induce laminar flow therein and thus cause the microfibrils to form a parallel arrangement but insufficient to induce turbulent flow. Preferably, a shearing rate of about from 50 sec$^{-1}$ to 1700 sec$^{-1}$ is employed. The shear field is applied for a period long enough to achieve the desired parallel arrangement of the protein aggregates. Usually, the shear is applied for a period of about one to 60 minutes.

After the aggregated protein molecules have been aligned in a parallel fashion, the solution is next subjected to conditions which will cause the aggregates to collide with one another. Collision of the aggregates may be effected by subjecting the aqueous solution to an oscillating shear field, i.e., one in which the shear repeats itself at equal intervals of time and moves back and forth over the same path.

The magnitude of the oscillating shear field must be great enough, and the period of application must be long enough, to cause the previously aligned aggregates to collide, thus forming a texturized protein. The magnitude of the oscillating shear field and the duration of its application can be adjusted to obtain a wide range of textures from that of a soft gel, to that of a chewy gel, and, finally, to a fully texturized protein material.

The type of oscillating shear field which is used in the process of the invention can also be obtained using conventional viscometers. For example, a viscometer which produces a unidirectional twisting shear can also produce an oscillating shear. In the latter instance, the oscillations are produced by allowing the twisting shear to periodically move back and forth over the same path. The back and forth motion is an angular deflection and the magnitude of the angular deflection and its frequency determine the degree of collision between the microfibrils and, ultimately, the degree of texturization. If this type of oscillating shear field is employed, it is preferred that the angle of deflection be from about 0.001 to 0.02 radians and the frequency be about from 0.01 to 10 hertz (cycles per second). However, any angle of deflection or frequency may be used as long as the desired degree of texturization is achieved.

It is also within the compass of the invention to apply both unidirectional shear and oscillating shear to the protein solution simultaneously. In this instance, the microfibrils would be aligned in a parallel arrangement, and then the aligned microfibrils would collide to form a texturized protein.

The aqueous solution of protein can be treated at a temperature of from about 0° to 40° C. The rate of texturization increases as the temperature increases. However, if temperatures greater than 40° C. are employed, denaturation of the protein occurs. Consequently, the temperature at which the aqueous solution is treated should never exceed the temperature at which the protein is denatured.

As mentioned above, the method of the invention allows production of a protein material with a consistency anywhere between a soft gel to full texturization, depending on the selection of the reaction parameters such as intensity of the oscillating shear field, the duration of the treatment, the temperature, etc. It is also within the compass of the invention to apply the above-described method to obtain a gelled protein and, then, to expose the gel to an aqueous solution with an ionic strength greater than 0.02. The result of this exposure is that the gelled protein is texturized further to a fibrous material with a meat-like texture.

To obtain further texturization of the gel in accordance with this particular embodiment of the invention, an appropriate amount of a salt can be added to the aqueous solution of the gelled microfibrils to obtain an ionic strength greater than 0.02. Salts which may be used are those listed previously for forming the microfibrillar aggregates. Sodium chloride is preferred because any residual salt which remains in the texturized protein will act as a flavoring agent. It is, however, important to note that all of the salt can be removed from the final product by application of an appropriate physical process such as centrifugation.

The invention is demonstrated further by the following illustrative examples.

EXAMPLE 1

Gellation of Alpha-gliadin

Alpha-gliadin was isolated from wheat by a procedure outlined by J. E. Bernardin et al., published in *The Journal of Biological Chemistry*, Vol. 242, pages 445–450 (1967).

An aqueous solution of alpha-gliadin (6.2%) was adjusted to pH 5.0 by addition of hydrochloric acid. The ionic strength of this solution was adjusted to 0.009 by addition of potassium chloride. Birefringence, determined by means of a polarizing microscope, indicated that the protein molecules had aggregated to form microfibrils approximately 60–62 angstroms in size.

The solution was then sheared (employing a unidirectional shear) at a rate of 58 sec$^{-1}$ for a period of 54 minutes in a cone plate viscometer (Weissenberg Rheogoniometer made by Sangamo Controls Limited). At this point there was yet no change in the solution properties. Uniform birefringence, determined as above, indicated, however, that the previously aggregated microfibrils had assumed a parallel arrangement.

Next, the solution was subjected to an oscillatory shear field (using a cone plate viscometer as above) at a frequency of 0.01 cycles per second with a displacement of 0.0166 radians. A gelled protein was obtained in less than 10 cycles (16.7 min.). The gellation was illustrated quantitatively as follows. The elastic shear modulus, determined by means of the cone plate viscometer, of the initial protein solution prior to application of the process of the invention thereto was 5 dyne/cm$^2$. The elastic shear modulus of the resultant gel was 16000 dyne/cm$^2$. It should be noted that the greater the elastic modulus, the greater the degree of gellation.

EXAMPLE 2

Texturization of Alpha-gliadin

A solution of alpha-gliadin (10.0%) was adjusted to pH 5.0 by addition of hydrochloric acid. The ionic strength of this solution was adjusted to 0.005 by addition of potassium chloride. Birefringence indicated that the alpha-gliadin molecules had aggregated to form microfibrils of about 60 angstroms.

The solution was forced through a glass capillary with a diameter of 0.5 mm. at a rate of 0.0375 ml. per minute. X-ray spectroscopy indicated that the microfibrils had assumed a parallel arrangement.

The flow of the solution through the capillary was pulsated (or oscillated) at one sec. increments for a period of 10 sec. As a result, the microfibrils became gelled.

The gelled material in the capillary was exposed to a potassium chloride solution with an ionic strength of 0.02. After 10 min. microscopic examination of the solution indicated that the gelled protein was further texturized to form macrofibrils of about 250,000 angstroms in diameter. The water content of the so-texturized protein was about 10%.

Having thus described my invention, I claim:

1. A process for texturizing a cereal grain protein capable of forming microfibrillar aggregates, which comprises
   a. dissolving the protein in water,
   b. adjusting the pH of the solution to 5.0 to 6.0,
   c. aggregating the protein molecules into microfibrils of about from 50 to 100 angstroms in diameter,
   d. aligning the microfibrils in a parallel arrangement, and
   e. causing the so-aligned microfibrils to collide to form a texturized protein.

2. The process of claim 1 wherein the cereal grain protein is alpha-gliadin.

3. A process for texturizing a cereal grain protein capable of forming microfibrillar aggregates, which comprises
   a. dissolving the protein in water,
   b. adjusting the pH of the solution to 5.0 to 6.0,
   c. adjusting the ionic strength of the solution to about from 0.004 to 0.010 to aggregate the protein molecules into microfibrils of about from 50 to 100 angstroms in diameter,
   d. exposing the microfibrils to a unidirectional shear field to align the microfibrils in a parallel arrangement, and
   e. exposing the so-aligned microfibrils to an oscillating shear field to form a textured protein.

4. The process of claim 3 wherein the pH is adjusted in Step b by addition of an amount of food-grade acid or alkali sufficient to achieve a pH of 5.0 to 6.0.

5. The process of claim 3 wherein the ionic strength is adjusted by addition of an amount of a salt sufficient to achieve an ionic strength of about from 0.004 to 0.010.

6. The process of claim 3 wherein the unidirectional shear field is produced by a viscometer.

7. The process of claim 3 wherein the oscillating shear field is produced by a viscometer.

8. The process of claim 3 wherein the unidirectional shear field in Step d and the oscillating shear field in Step e are applied simultaneously.

9. The process of claim 3 wherein the protein is alpha-gliadin.

10. A process for texturizing a cereal grain protein capable of forming microfibrillar aggregates, which comprises
   a. dissolving the protein in water,
   b. adding an appropriate amount of food-grade acid or alkali to the solution to adjust the pH thereof to 5.0 to 6.0,
   c. adding an appropriate amount of a salt to the solution to adjust the ionic strength thereof to about from 0.004 to 0.01 to aggregate the protein molecules into microfibrils of about from 50 to 100 angstroms in diameter,
   d. exposing the microfibrils to a unidirectional shear field of sufficient magnitude and duration to align the microfibrils in a parallel arrangement, and,
   e. exposing the so-aligned microfibrils to an oscillating shear field of sufficient magnitude and duration to form a texturized protein.

11. The process of claim 10 wherein the cereal grain protein is alpha-gliadin.

12. A process for texturizing a cereal grain protein capable of forming microfibrillar aggregates, which comprises
   a. dissolving the protein in water,
   b. adjusting the pH of the solution to 5.0 to 6.0,
   c. adjusting the ionic strength of the solution to about from 0.004 to 0.010 to aggregate the protein molecules into microfibrils of about from 50 to 100 angstroms in diameter,
   d. exposing the microfibrils to a unidirectional shear field to align the microfibrils in a parallel arrangement,
   e. exposing the so-aligned microfibrils to an oscillating shear field to form a gelled protein, and
   f. adjusting the ionic strength of the solution to greater than 0.02 to further texturize the gelled protein.

13. The process of claim 12 wherein the cereal grain protein is alpha-gliadin.

14. A process for texturizing a cereal grain protein capable of forming microfibrillar aggregates, which comprises
   a. dissolving the protein in water,
   b. adjusting the pH of the solution to 5.0 to 6.0,
   c. adjusting the ionic strength of the solution to about from 0.004 to 0.010 to aggregate the protein molecules into microfibrils of about from 50 to 100 angstroms in diameter,
   d. maintaining a flow of the solution through a tube, the rate of flow and the diameter of the tube being sufficient to align the microfibrils in a parallel arrangement, and
   e. oscillating the flow of the solution through the tube for a time and at a frequency sufficient to cause the so-aligned microfibrils to collide to form a texturized protein.

15. The process of claim 14 wherein the cereal grain protein is alpha-gliadin.

\* \* \* \* \*